United States Patent Office 3,652,491
Patented Mar. 28, 1972

3,652,491
BORON-REINFORCED COMPOSITE
Lawrence E. Nielsen, Creve Coeur, and Joseph E. Fields, Ballwin, Mo., assignors to Monsanto Company, St. Louis, Mo.
No Drawing. Filed Aug. 20, 1968, Ser. No. 753,856
Int. Cl. C08f *45/10*
U.S. Cl. 260—41
5 Claims

ABSTRACT OF THE DISCLOSURE

A shaped composite structure comprising boron fiber as reinforcing filler in a matrix comprising the zinc salt of an acrylic acid polymer, and the method of preparing the same which comprises heating in a mold at a temperature of from about 175° C. to 400° C. and a pressure of from about 5,000 p.s.i. to 50,000 p.s.i. mixture of zinc oxide and an acrylic acid polymer in contact with the boron fiber.

---

The invention described herein was made in the course of or under a contract or subcontract thereunder with the U.S. Department of Defense, Office of Naval Research.

BACKGROUND OF THE INVENTION

(1) Field of the invention

Fiber-reinforced shaped composite structures comprising metal salts of acrylic acid polymers.

(2) Prior art

Metal salts of some polymeric acids, including polyacrylic acid and acrylic acid copolymers, are described in the article by W. E. Fitzgerald and L. E. Nielson, "Viscoelastic Properties of the Salts of Some Polymeric Acids," Proc. Royal Soc., A282, 137–146 (1964), and in the D. A. Fiegley, Jr., Pat. No. 2,880,090 and the A. L. Smith et al. Pat. No. 2,961,364. Depending upon the metal and upon the nature of the organic portion of the polymer, the salts vary greatly in solubility and thermal stability. In said Feigley and said Smith et al. patents, the polymeric salts are applied to fibers in dispersion, and the coated fibers thus obtained are employed as reinforcing fillers in a different type of matrix, e.g., in a vinyl halide resin or in a thermosetting resin. Hence, the properties of the composite structures obtained by said patentees are not so dependent upon the polymeric metal salt as they are when the latter is the matrix rather than only a coating for the filler. As reported in the Fitzgerald and Nielsen paper, metal salts of the polymeric acids, alone, are too brittle for most structural applications.

Boron fibers or filaments are well known in the art to be valuable reinforcing agents for purely organic polymeric matrices such as the polyester or epoxide resins. Properties of boron filaments are described, for example, by Harvey H. Herring in the Report to the National Aeronautics and Space Administration, which is entitled "Selected Mechanical and Physical Properties of Boron Filaments," and identified as NASA–TN–D 3202, January, 1966, and also the report by Robert M. Witucki, entitled "Boron Filaments" and available from the Office of Technical Services, Arlington, Virginia, as publication CR–96. Boron is highly reactive and is susceptible to attack by numerous chemicals, including many of the commercially available polymers. For that reason, in the prior art, it has often been necessary to provide for separating boron fiber from the polymeric matrix, e.g., by employing an intermediate layer of an inert material between the fiber and the matrix, by coating the said fiber for protection against the destructive action of the matrix. In the present instance, there appears to be no degradation of the boron fiber or filament during composite fabrication; and, although interaction of a kind may occur between boron and the zinc salt of the acrylic polymer or between boron and the precursors of said salt, such interaction, if any, results in a beneficial effect which is exhibited by very good mechanical and thermal properties.

SUMMARY OF THE INVENTION

According to the invention there is provided a shaped composite structure comprising a reinforcing fiber which consists essentially of boron and, as matrix for said fiber, the normally solid zinc salt of polyacrylic acid or of a copolymer of acrylic acid and a vinyl monomer copolymerizable therewith, the ratio of said acrylic acid to said vinyl monomer being such that said copolymer consists at least 50 mole percent of acrylic acid units.

The reinforcing fiber may be entirely of boron or it may be a fiber or filament formed by vapor phase deposition of boron on a core of a high melting metal. It may be present in the composite in long (continuous) or short (discontinuous) form. When present in either form it may be positioned uniaxially, i.e., in orientation along its axis, or heterogeneously. The boron filament may also be present in woven or braided form, e.g., as a tape, whereby the composite structure is essentially a laminate comprising alternating layers of the zinc salt and the braid or textile of boron filaments.

The shaped composites are preferably made by mixing solid, finely comminuted polymer with zinc oxide in a quantity calcuated to be approximately that which is stoichiometrically required for reaction of two carboxy groups of the polymer with one molar equivalent of zinc oxide, contacting the resulting mixture with the filament, and compression molding the whole at a temperature of from about 175° to 400° C. and a pressure of from about 5,000 to 50,000 p.s.i.

DESCRIPTION OF THE PREFERRED EMBODIMENTS

The invention provides a shaped composite structure wherein the matrix is a zinc salt of an acrylic acid polymer and the reinforcing filler is a boron fiber or filament. The acrylic acid polymer may be a homopolymer of acrylic acid or a copolymer of acrylic acid and a monomer copolymerizable therewith, e.g., a compound having the group >CH=CH— such as vinyl acetate, vinyl chloride, styrene, acrylonitrile, acrylamide, etc. Copolymers of acrylic acid and alkyl acrylates are especially useful, and particularly preferred for the present purpose are copolymers consisting at least 50 mole percent of acrylic acid units with the balance being alkyl acrylate units wherein the alkyl radical has from 1 to 12 carbon atoms, e.g., methyl, ethyl, isopropyl, butyl, pentyl, hexyl, 2-ethylhexyl, n-octyl, tert-nonyl, n-decyl, 2-ethylnonyl, or n-dodecyl acrylate. Use of such alkyl acrylate comonomers with the acrylic acid appears to contribute to a degree of flexibility of copolymer which is amenable to the preparation of the more useful zinc salts.

Vapor-phase deposition of boron on a filament of a high melting metal, e.g., tungsten, tantalum, molybdenum or titanium, is generally employed in the manufacture of boron filaments; therefore, the filament core is generally a metal or metal boride. Irrespective of the nature of the core, the art usually refers to the filaments as boron filaments, and this terminalogy will be used hereinafter. Presently, the most readily available of the boron fibers of reinforcing grade are those which have been produced by vapor deposition of boron on tungsten.

The quantity of boron filament in the composites will vary greatly, depending upon the properties desired; however, in order to impart significant improvements as compared to the un-reinforced polymeric material, the filament should be present in a quantity of at least 5 percent by volume of the composite. Boron filament loadings of as high as about 90 percent by volume are attainable; however, for obtaining the optimum modulus and strength characteristics, it is preferred to employ the boron filament in a quantity which is from, say, about 15% to 60% by volume of the finished composite.

The filament may be present either in the continuous or discontinuous form. By "continuous form" is meant the positioning of the filament length along one dimension of the composite structure. By "discontinuous form" is meant use of very small lengths of the filament, say, pieces which may vary from about $\frac{1}{32}''$ or less to about $\frac{1}{4}''$, which pieces are usually smaller than any one dimension of the shaped object. Use of continuous lengths of the filament generally provides for uniaxial positioning of the filament; the orientation thus obtained generally contributes to the strength of the shaped composite.

The zinc salt of the polymer is generally formed in situ during the molding. Preferably, the shaped composite is made by mixing finely comminuted acrylic polymer with finely comminuted zinc oxide, and contacting this mixture with the boron filament. Reaction of the zinc oxide with the carboxy groups of the polymer during the molding occurs by salt formation. The salt thus formed may be a di-salt produced by cross-linking of two carboxy radicals which are present in different polymer chains, or it may be a di-salt formed by intramolecular cyclization of two carboxy groups on the same chain. When large excesses of zinc oxide are present, over the quantity required for the formation of the di-salts, the zinc oxide may also react to form the pendent mono-salt, wherein a single carboxy radical of the polymer is changed to the group

rather than two carboxy radicals changed to the grouping

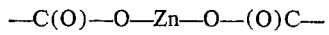

either inter- or intra-molecularly.

Because the di-salts possess more desirable mechanical and temperature properties than do the mono-salts, it will be generally found advantageous to employ the zinc oxide in a quantity which is about that which is stoichiometrically required for reaction of two carboxy groups of the polymer with one molar equivalent of zinc oxide. However, the zinc oxide may be used in lesser or greater quantities. When present in lesser quantities, the product may be substantially free of the mono-salt groups, but it will possess unreacted carboxy radicals. For many purposes, this is not detrimental to satisfactory utilization of the shaped composites. When the zinc oxide is present in a quantity which is more than that required for di-salt formation, the product will generally consist of some mono-salts and di-salts, and possibly unreacted zinc oxide. Although such compositional heterogeneity does not result in products of optimum properties, here again, for some applications the shaped composites are amply useful. Generally, however, it will be found that a mixture of carboxy-containing polymer and zinc oxide in a proportion of from, say, about one mole of zinc oxide per from 1 to 2.5 carboxy radicals of the polymer will give good results when employed with reinforcing fibers or filaments consisting essentially of boron.

When the boron filler is used in discontinuous form, the mixture of zinc oxide and polymer is mixed with the very short lengths of fiber to homogeneity, and the whole is placed in the mold for forming under heat and pressure. When the boron filler is used in lengths which are substantially equal to a dimension of the desired article, the lengths are positioned in the mold in either uni- or multi-directional array in layers which alternate with layers of the zinc oxide-polymer mixture. Tapes or textiles of the boron fiber are similarly used in the mold for the production of laminates.

It has been found that it is advantageous to allow the polymer to soften and flow in the mold before the temperature is raised to that which favors reaction of zinc oxide with the carboxylic groups of the polymer. For that reason, the molding cycle preferably includes gradual increase of the temperature to about 130 to 250° C. while increasing the pressure, whereby intimate contact of the reactants is obtained and dimensional conformity to the mold surfaces is realized. For salt-formation, a temperature of about 300° C. gives optimum results; generally, depending upon the nature of the polymer and the zinc oxide: polymer ratio, a temperature range of, say, from about 250° C. to 350° C. and pressures of from about 5,000 to 50,000 p.s.i., preferably from 7,500 to 15,000 p.s.i., will be used after the initial flow period. During the molding cycle the pressure is advantageously released from time to time in order to permit the evolved water vapor to escape before the final molding temperature is reached. In experimental runs, the completeness of the chemical reaction, and hence of the molding process, may be checked by X-ray analyses of the metal oxide and by infrared analyses of the carboxylic acid group in the molded specimen.

Previous to incorporation with the zinc oxide and the acrylic polymer, the fiber may or may not be pre-treated with an anchoring or bonding agent. Such an agent is usually a bifunctional compound having a reactive group which reacts with or becomes otherwise attached, e.g., by hydrogen bonding, to the filler, and another reactive group which reacts with, or is somehow attached to, the resin matrix. An example of a commonly used anchoring agent is γ-aminopropyltriethoxysilane, which is a readily available commercial agent of the family of silane couplers. Other aminoalkylalkoxysilanes which may be used are those which are disclosed in U.S. Pat. Nos. 2,832,754 and 2,930,809. Although these couplers or any of the silane couplers are of most present interest, other anchoring or coupling agents are likewise useful, e.g., the Werner type complex compounds such as methacrylatochromic chloride or other compounds of this type described in U.S. Pat. No. 2,552,910.

The invention is further illustrated by, but not limited to, the following examples:

EXAMPLE 1

Employing a Spex mixer containing one Plexiglas ball, 5 g. of powdered 94:6 weight ratio acrylic acid/2-ethylhexyl acrylate copolymer was mixed with 2.7 g. of powdered zinc oxide. Then 4.3 g. of $\frac{1}{8}''$ lengths of boron/tungsten filament were mixed in to give a homogeneous mixture. Said filament had a 0.5 ml tungsten core and an 0.4 mol coating of boron (total diameter, 1.3 mil). The mixture was placed in a positive pressure mold and submitted to the following molding cycle:

to 200° C.—10,000 p.s.i.—10 min.—vented
to 250° C.—10,000 p.s.i.—10 min.—vented
at 250° C.—10,000 p.s.i.—15 min.—vented
at 250° C.—10,000 p.s.i.—15 min.—vented
to 300° C.—10,000 p.s.i.—10 min.—vented
at 300° C.—10,000 p.s.i.—10 min.—vented
at 300° C.—10,000 p.s.i.—5 min.—vented
cool down to 100° C.—10,000 p.s.i.—25 min.

The molded test specimens, having a 20% volume fraction of filler, were smooth, hard, and white in color, with specks of clear blue (the boron/tungsten fiber) homogeneously distributed throughout. Evaluation with an Instron Tester gave an average flexural strength of 11,470 p.s.i. and an average flexural modulus of 4,930,000 p.s.i. (3 samples).

EXAMPLE 2

The filler employed in this example was boron/tungsten fiber having a thickness of 4 mils and consisting of boron coated on a 0.5 ml. thick tungsten core. It was treated with a silane coupler by soaking 1.0 g. of the fiber for 30 minutes in 20 ml. of a 1% acetone solution of γ-aminopropyltriethoxysilane, and drying for 10 minutes at 110° C. to drive off the acetone.

An intimate mixture of 10 g. of powdered 94:6 weight ratio acrylic acid/2-ethylhexyl acrylate copolymer and 5.3 g. of powdered zinc oxide was prepared by mixing the components for about 10 minutes in a Spex mixer containing 2 Plexiglas balls. Alternating layers of said mixture and the dried fiber were positioned in a positive pressure mold, each layer of the fiber weighing 1.2 g. The fiber was laid uniaxially on top of a bottom layer of the powdered mixture to give a composite structure having 5 layers of the fiber and 6 layers of the powder. The structure was molded using substantially the molding cycle of Example 1, except that heating to 200° C. was conducted for 15 minutes at a pressure of 5,000 p.s.i., and no venting was employed before increasing the temperature to 250° C. and the pressure to 10,000 p.s.i. holding under these conditions for 8 minutes before venting. The hard, molded test specimens thus obtained having a 40% volume fraction of filler, had very smooth, glossy surfaces. Evaluation with the Instron tester gave a flexural strength of about 110,000 p.s.i. and a flexural modulus of about 18,520,000 p.s.i.

The invention thus provides very heat-resistant, extremely tough, shaped composite structures which, depending upon the configuration of the mold, are useful in numerous industrial and space applications wherein high-strength, thermally stable components are required; e.g., rocket nozzles, diffusers, missile re-entry skin panels, rocket combustion insulators, and high temperature insulators of all kinds.

It is to be understood that changes and variation may be made without departing from the spirit and scope of the invention as defined in the appender claims.

What we claim is:

1. A shaped composite structure comprising a boron fiber as reinforcing filler in a matrix comprising the zinc salt of an acrylic acid copolymer, said structure having been prepared by compression molding, at a temperature of about 175° C. to 400° C. and a pressure of from about 5,000 to 50,000 p.s.i., a finely comminuted mixture of zinc oxide and said copolymer in contact with the fiber, the quantity of oxide in the mixture being approximately that which is stoichiometrically required for reaction of two carboxy groups of the copolymer with one molar equivalent of the oxide.

2. The structure defined in claim 1, further limited in that said boron fiber has a metal core enveloped by a coating of boron.

3. The structure defined in claim 1, further limited in that the polymer is a copolymer of acrylic acid and a vinyl monomer copolymerizable therewith, the ratio of said acrylic acid to said vinyl monomer being such that said copolymer consists at least 50 mole percent of acrylic acid units.

4. The structure defined in claim 1, further limited in that the polymer is a copolymer of acrylic acid and an alkyl acrylate having 1 to 12 carbon atoms in the alkyl radical and consisting at least 50 mole percent of acrylic acid units.

5. The structure defined in claim 1, further limited in that the fiber has a core of tungsten enveloped by boron and that the polymer is a copolymer of acrylic acid and 2-ethylhexyl acrylate which consists at least 50 mole percent of acrylic acid units.

References Cited

UNITED STATES PATENTS 3,322,734   5/1967   Rees _____ 260—79.3

OTHER REFERENCES

Fitzgerald et al., Viscoelastic Properties of the Salts of Some Polymer Acids, in Royal Society of London, Ser. A, vol. 282, Oct. 20, 1964, pp. 137–146.

Modern Plastics Encyclopedia, 1967, vol. 44, No. 1A, September 1966, p. 616.

MORRIS LIEBMAN, Primary Examiner

J. H. DERRINGTON, Assistant Examiner

U.S. Cl. X.R.

161—170